US009498887B1

(12) United States Patent
Zevenbergen et al.

(10) Patent No.: US 9,498,887 B1
(45) Date of Patent: Nov. 22, 2016

(54) TWO-FACED LINEARLY ACTUATED GRIPPER

(71) Applicant: X Development LLC, Mountain View, CA (US)

(72) Inventors: John Zevenbergen, San Francisco, CA (US); Ethan Rublee, Mountain View, CA (US); Kurt Konolige, Menlo Park, CA (US); Troy Straszheim, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 61 days.

(21) Appl. No.: 14/340,398

(22) Filed: Jul. 24, 2014

(51) Int. Cl.
*B25J 15/06* (2006.01)
*B65G 59/04* (2006.01)

(52) U.S. Cl.
CPC ............ *B25J 15/0616* (2013.01); *B65G 59/04* (2013.01); *B65G 2203/042* (2013.01)

(58) Field of Classification Search
CPC ............ B65G 47/1485; B65G 47/914; B65G 47/918; B65G 49/067; B65G 59/04; B65G 2249/04; B25J 15/0616; B25J 9/046
See application file for complete search history.

(56) References Cited

U.S. PATENT DOCUMENTS

| 4,319,864 | A | * | 3/1982 | Kaufeldt | B25J 18/02 318/163 |
| 5,040,942 | A | * | 8/1991 | Brinker | B65G 61/00 414/796 |
| 5,102,292 | A | * | 4/1992 | Brinker | B65G 61/00 414/796 |
| 5,190,430 | A | * | 3/1993 | Neri | B65B 43/185 414/412 |
| 5,564,893 | A | * | 10/1996 | Tacchi | B65G 61/00 414/796.9 |
| 5,984,623 | A |   | 11/1999 | Smith et al. | |
| 6,652,014 | B2 | * | 11/2003 | Schmalz | B65G 47/91 294/65 |
| 8,162,362 | B2 | * | 4/2012 | Braunschweiger | B65G 61/00 294/188 |
| 8,473,094 | B2 | * | 6/2013 | Becker | B65G 47/914 294/65 |
| 2007/0280812 | A1 | * | 12/2007 | Morency | B25J 15/0253 414/729 |
| 2011/0268548 | A1 | * | 11/2011 | Doll | B25J 15/00 414/815 |
| 2012/0039697 | A1 |   | 2/2012 | Jin et al. | |
| 2014/0179501 | A1 | * | 6/2014 | Akama | B25J 15/0052 493/162 |
| 2016/0137435 | A1 | * | 5/2016 | Tanaka | B65G 47/914 414/564 |

FOREIGN PATENT DOCUMENTS

FR 2617078 A1 * 12/1988 .......... B25J 15/0616
JP 03152091 A * 6/1991
JP 11070917 A * 3/1999

* cited by examiner

*Primary Examiner* — Gerald McClain
(74) *Attorney, Agent, or Firm* — McDonnell Boehnen Hulbert & Berghoff LLP

(57) ABSTRACT

An example two-faced linearly actuated suction gripper includes a first gripping surface having one or more first suction cups arranged to provide suction in a first direction. The suction gripper also includes a second gripping surface comprising one or more second suction cups arranged to provide suction in a second direction which is perpendicular to the first direction. The suction gripper further includes a linear actuator configured to provide movement of the second gripping surface parallel to the second direction towards a face of an object. The suction gripper includes a sensor configured to generate data indicating that the face of the object is adjacent to the second gripping surface; and an engageable brake that, when engaged, stops the movement of the linear actuator in response to the data from the sensor indicating that the second gripping surface is adjacent to the face of the object.

14 Claims, 16 Drawing Sheets

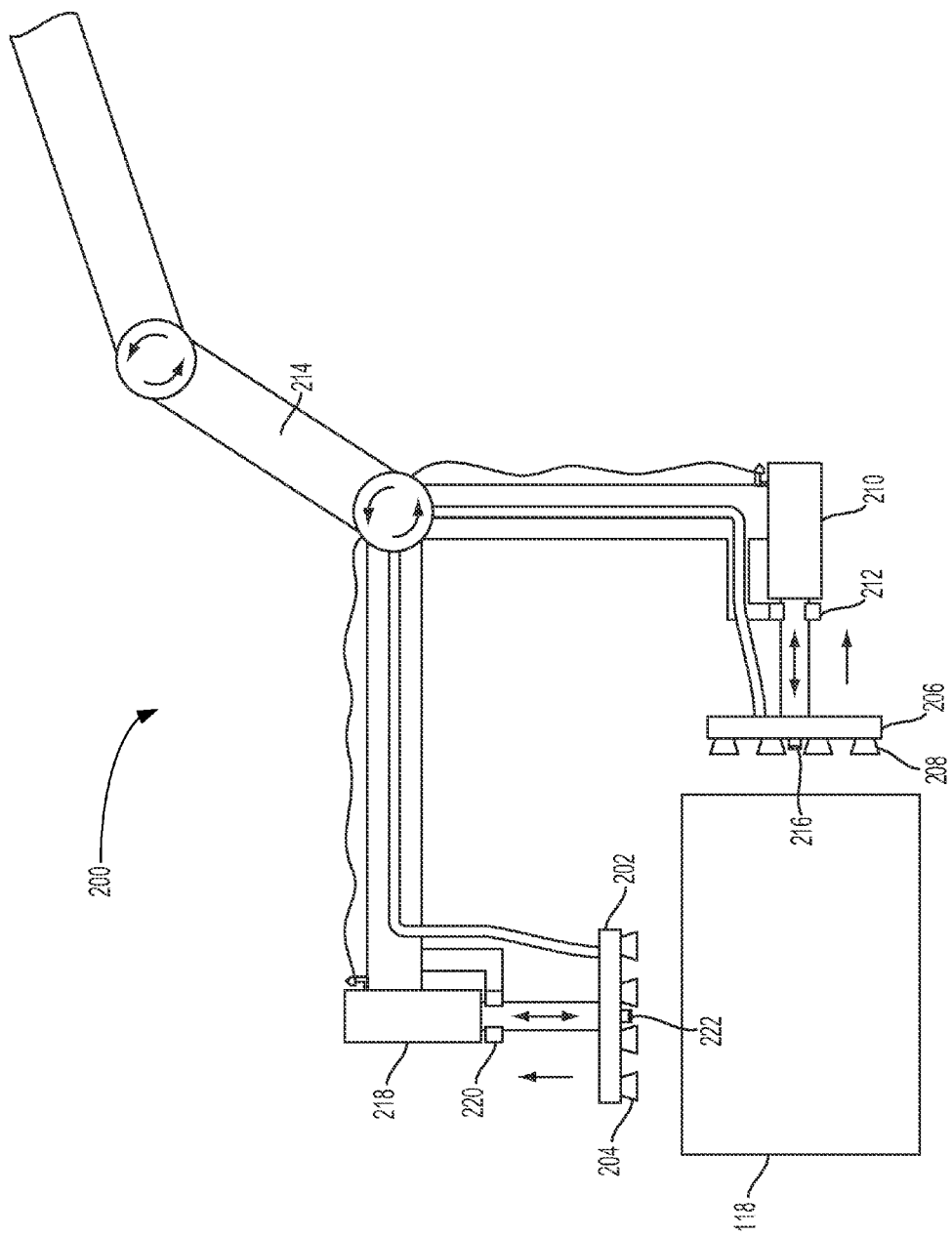

though otherwise indicated herein, the materials described in this section are not prior art to the claims in this application and are not admitted to be prior art by inclusion in this section.

TWO-FACED LINEARLY ACTUATED GRIPPER

BACKGROUND

Unless otherwise indicated herein, the materials described in this section are not prior art to the claims in this application and are not admitted to be prior art by inclusion in this section.

End effectors are devices at the end of robotic manipulators (e.g., robotic arms) that are designed to interact with the environment. End effectors may include a gripper, such as a claw complex or a tool. Grippers may have a variety of gripping surfaces, such as jaws, claws, or mechanical fingers. The shape of the gripping surface can be chosen according to the shape of the objects that are to be manipulated by the gripper.

Some grippers may function using one or more suction cups, perhaps affixed to one or more gripping surfaces. A vacuum pump may apply suction to the suction cups. Then, when the suction cups come into contact with an object, the suction cups may grip the object by way of suction. A robotic manipulator connected to the suction cup gripper may then manipulate the gripped object.

SUMMARY

In one example, a suction gripper is provided that includes a first gripping surface comprising one or more first suction cups arranged to provide suction in a first direction and a second gripping surface comprising one or more second suction cups arranged to provide suction in a second direction which is perpendicular to the first direction, where the second gripping surface is linearly-movable relative to the first gripping surface. The suction gripper also includes a linear actuator configured to provide movement of the second gripping surface along the second direction towards a face of an object. The suction gripper further includes a sensor configured to generate data indicating that the face of the object is adjacent to the second gripping surface and an engageable brake that, when engaged, stops the movement of the linear actuator in response to the data from the sensor indicating that the second gripping surface is adjacent to the face of the object.

In another example, a method to facilitate gripping an object is provided. The method involves positioning, by a robotic manipulator, a first gripping surface of a suction gripper adjacent to a first face of an object, where the first gripping surface comprises one or more first suction cups arranged to provide suction in a first direction. The method also involves moving, by a linear actuator of the suction gripper, a second gripping surface of the suction gripper in a second direction that is perpendicular to the first direction towards a second face of the object, where the second gripping surface comprises one or more second suction cups arranged to provide suction in the second direction. The method further involves detecting, by a sensor, that the second gripping surface is adjacent to the second face of the object. Then method includes in response to the detection, braking, by a brake, the movement of the second gripping surface in the second direction, and gripping, by the first gripping surface and the second gripping surface, the object.

In still another example, another method to facilitate gripping an object is provided. The method involves positioning, by a robotic manipulator, a suction gripper in proximity to an object. The method also involves moving, by a first linear actuator, a first gripping surface of the suction gripper in a first direction towards a first face of the object, where the first gripping surface comprises one or more first suction cups arranged to provide suction in the first direction. The method further involves moving, by a second linear actuator, a second gripping surface of the suction gripper in a second direction that is perpendicular to the first direction towards a second face of the object, where the second gripping surface comprises one or more second suction cups arranged to provide suction in the second direction. The method involves detecting, by a first sensor, that the first gripping surface is adjacent to the first face of the object and in response to the detecting, braking, by a first brake, the movement of the first gripping surface in the first direction. The method also involves detecting, by a second sensor, that the second gripping surface is adjacent to the second face of the object, and in response to the detecting, braking, by a second brake, the movement of the second gripping surface in the second direction. The method also involves gripping, by the first gripping surface and the second gripping surface, the object.

In yet another example, a system is provided that includes a means for positioning, by a robotic manipulator, a first gripping surface of a suction gripper adjacent to a first face of an object, where the first gripping surface comprises one or more first suction cups arranged to provide suction in a first direction. The system further includes a means for moving, by a linear actuator of the suction gripper, a second gripping surface of the suction gripper in a second direction that is perpendicular to the first direction towards a second face of the object, where the second gripping surface comprises one or more second suction cups arranged to provide suction in the second direction. The system also includes a means for detecting, by a sensor, that the second gripping surface is adjacent to the second face of the object and a means for in response to the detection, braking, by a brake, the movement of the second gripping surface in the second direction. The system includes a means for gripping, by the first gripping surface and the second gripping surface, the object.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 2 is a side-view of another example suction gripper.

DETAILED DESCRIPTION

Figure 1:
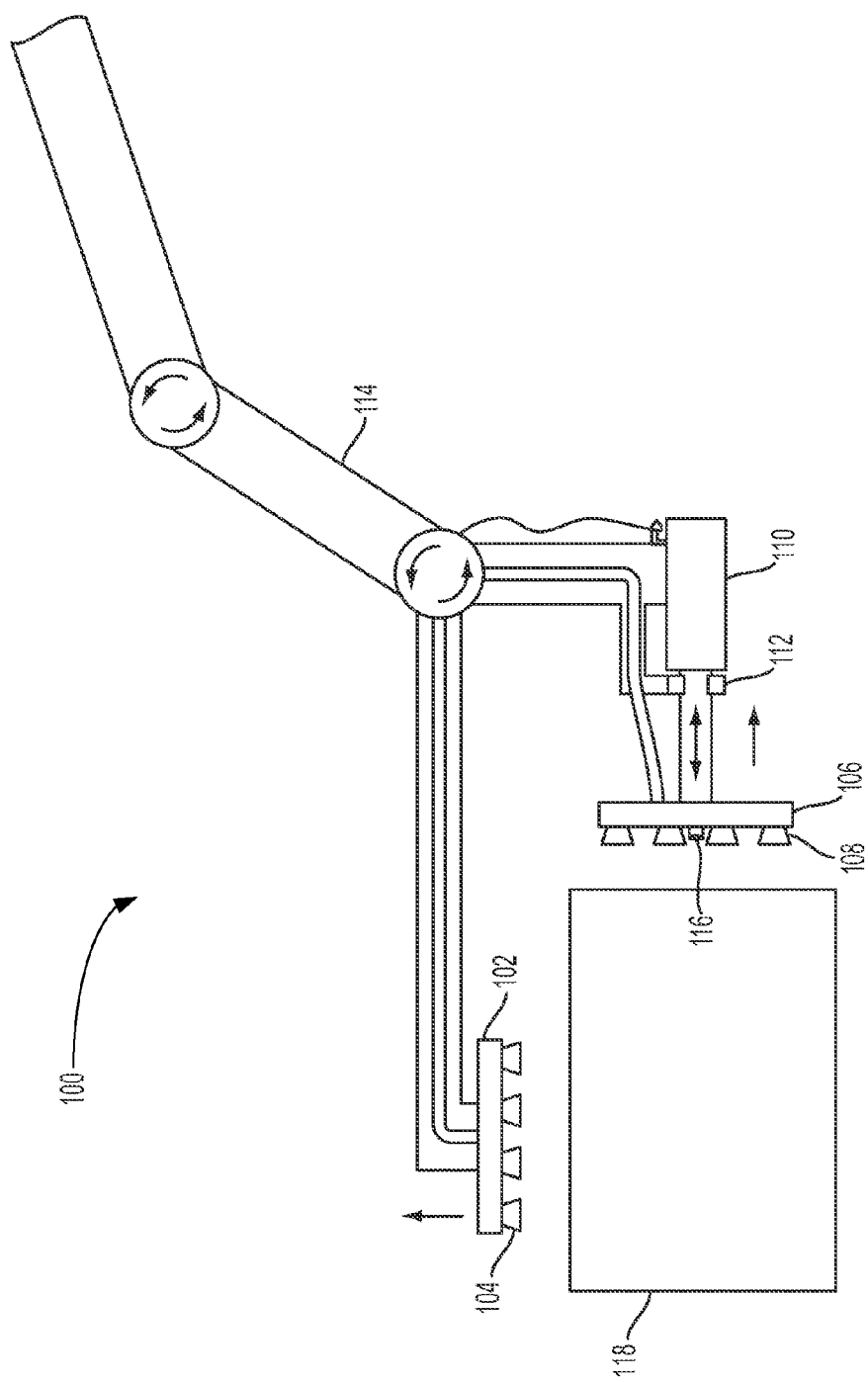
FIG. 1 is a side-view of an example suction gripper.

Example methods and systems are described herein. Any example implementation or feature described herein is not necessarily to be construed as preferred or advantageous over other implementations or features. The example implementations described herein are not meant to be limiting. Certain aspects of the disclosed systems and methods can be arranged and combined in a wide variety of different configurations, all of which are contemplated herein.

Furthermore, the particular arrangements shown in the Figures should not be viewed as limiting. Other implementations might include more or less of each element shown in a given Figure. Further, some of the illustrated elements may be combined or omitted. Yet further, an example implementation may include elements that are not illustrated in the Figures.

Example implementations provide for suction grippers that may facilitate gripping objects (e.g., boxes). An example suction gripper may include two gripping surfaces (e.g., a first gripping surface and a second gripping surface) that are perpendicular to one another. The first gripping surface may include one or more first suction cups arranged to provide suction in a first direction. The second gripping surface may include one or more second suction cups arranged to provide suction in a second direction which is perpendicular to the first direction. The first gripping surface and the second gripping surface may function together to grip objects, such as boxes, which may have two or more faces that are substantially perpendicular to one another.

In operation, a robotic manipulator may position the first gripping surface adjacent to a first face of an object (e.g., the top of a box). A linear actuator may move the second gripping surface in a third direction that is opposite the second direction (i.e., the direction of suction of the second suction cups) toward a second face of the object (e.g., a side of the box). During such movement of the second gripping surface towards the second face of the object, a sensor may detect that the second gripping surface is adjacent to the second face of the object. In response to detecting that the second gripping surface is adjacent to the second face of the object, a brake may break the movement of the second gripping surface in the third direction. Such braking may stop the second gripping surface in a position that is adjacent to the second face of the object. A brake may be chosen that engages quickly, so as to brake the second gripping surface before the one or more second suction cups deform against the second face of the object.

When the first gripping surface is adjacent to the first face of the object and the second gripping surface is adjacent to the second face of the object, the suction gripper may grip the object. More particularly, a vacuum pump may provide suction to the first suction cups of the first gripping surface and the second suction cups of the second gripping surface.

In some circumstances, by linearly actuating the second gripping surface until the second gripping surface is adjacent to the second face of the object, the suction gripper may reduce deformation (e.g., rolling or warping) of the one or more second suction cups when gripping the object. Deformed suction cups may provide less suction force because the deformation may impede the volume formed by the suction cup and the face of the object from holding a negative pressure relative to the environment. Instead of deforming, the suction cups may align evenly with the face of the object, and then grip the face of the object with a suction force that is perpendicular to the face of the object. Suction forces that are perpendicular (or approximately perpendicular) to the gripped faces may be relatively stronger than suction forces that are at an angle to the gripped faces of the object, which may result from rolled or warped suction cups.

Further, while the gripper is gripping the object, the brake may hold the second gripping surface in position adjacent to the second face of the object. This may take some or all of the weight of the object and the second gripping surface off of the linear actuator. With the weight of the object and the second gripping surface off of the linear actuator, the linear actuator may disengage such that less or no energy is consumed by the linear actuator while the gripper is gripping the box, since the brake is holding the second gripping surface in position adjacent to the second face of the object.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various examples, described herein are apparatuses and systems which may facilitate automated loading and/or unloading of boxes and/or other objects, such as into a storage container or from a vehicle. In some example implementations, boxes or objects may be automatically organized and placed onto pallets. Within examples, automating the process of loading/unloading trucks and/or the process of creating pallets from objects for easier storage and transport may provide a number of industrial and business advantages.

Automating the process of loading/unloading trucks and/ or the process of creating pallets may include the incorporation of one or more robotic apparatuses having one or more robotic manipulators to move objects or perform other functions. The robotic manipulators may have various end-effectors, an example of which may be a suction gripper.

In some examples, a system including one or more sensors, one or more computers, and one or more robotic arms is described. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Referring now to the figures, FIG. 1 is a side-view of an example suction gripper 100 and a box 118, which may be gripped by the suction gripper 100. The suction gripper 100 includes a first gripping surface 102 and a second gripping surface 106. The first gripping surface 102 and the second gripping surface 106 are attached to a robotic arm 114. The robotic arm 114 may facilitate moving the first gripping surface 102 and the second gripping surface 106 into various positions, such as into a position in which the first gripping surface 102 is adjacent to the object 118.

The first gripping surface 102 and the second gripping surface 106 include one or more first suction cups 104 and one or more second suction cups 108 respectively. An example suction cup may have a curved surface (e.g., a circular cup). When the curved surface is pressed against a face of an object, the volume between the curved surface and the face may be reduced, which may in turn expel fluid (e.g., air) in the volume past the rim of the curved surface. The volume may then have a negative pressure relative to the environment, which may create a suction force between the curved surface and the face of the object. This suction force may be created or increased by way of a pump that increases the pressure differential between the negative pressure in the volume and the environment. For instance, an air pump connected to respective ports in the one or more first suction cups 104 and in the one or more second suction cups 108 may pump air out of one or more respective volumes formed by the suction cups and a face of an object, such as the object 118.

The one or more first suction cups 104 and one or more second suction cups 108 may be arranged on the first gripping surface 102 and the second gripping surface 106 in different layouts, which may differ based on factors such as the shape, size, or weight of objects to be picked up by the suction gripper 100. For instance, a gripping surface may include four suction cups in a line. Alternatively, a gripping surface may include suction cups in a grid, such as a three by two grid of six suction cups. Many combinations are possible. Further, the layout of the one or more suction cups 104 on the first gripping surface 102 need not necessarily be the same layout as the one or more suction cups 108 on the second gripping surface 106. In some cases, the air pump may be selectively connected to a subset of the one or more first suction cups 104 and one or more second suction cups 108.

The one or more first suction cups 104 and one or more second suction cups 108 may provide suction in respective directions, as shown. The one or more first suction cups 104 may provide suction in a first direction, and the one or more suction cups 108 may provide suction in a second direction that is perpendicular to the first direction. The first direction and the second directions may be in respective directions away from an object to be gripped by the suction gripper 102. As shown in FIG. 1, the one or more suction cups 104 may provide suction in an upwards (i.e., vertical) direction relative to the box 118, and the one or more suction cups 108 may provide in a rightwards (i.e., horizontal) direction relative to the box 118. The upwards and rightwards directions may change as the robotic arm 114 changes the position and orientation of the first gripping surface 102 and the second gripping surface 106. However, in some implementations, the gripping surfaces may be fixed in orientation relative to one another such that the first direction of suction of the one or more first suction cups 104 and the second direction of the one or more second suction cups 108 remains perpendicular to one another before, during, and after such movement.

The first gripping surface 102 may be mounted to the robotic arm 114 by way of a fixed mount. According to various implementations, the fixed mount may extend from the robotic arm at a variety of distances, in order to grip faces of objects of different sizes at different points on the face. For instance, the fixed mount may extend from the robotic arm to grip the front half of the face of the object (relative to the robotic arm), the middle of the face of the object, or the back half of a face of the object (also relative to the robotic arm). An instance of the fixed mount in which the fixed mount extends from the robotic arm 114 to a lesser degree may be advantageous for environments in which working space is relatively limited. Another instance of the fixed mount in which the fixed mount extends from the robotic arm 114 to a greater degree may provide more stability to gripped objects in some circumstances.

The second gripping surface 106 may be mounted to the robotic arm 114 by way of a linear actuator 110. In some cases, an electric motor, such as an electric servomotor, may actuate the linear actuator 110. The linear actuator 110 may include a piston-cylinder assembly. The piston-cylinder assembly may include a piston that is extendable longitudinally from the cylinder in a direction perpendicular to the second gripping surface 106. Such extension of the piston may move the second gripping surface 106 towards a face of an object. In some circumstances, extension of the linear actuator 110 may cause the second gripping surface 106 to move towards a side of the box 118, perhaps in the situation in which the first gripping surface 102 is adjacent to the top side of the box 118, as shown in FIG. 1.

The suction gripper 100 may include a sensor 116. The sensor may be configured to generate data indicating that an object (such as the box 118) is adjacent to the second gripping surface 106. Such a sensor may be a proximity sensor, such as an infrared, capacitive, photoelectric, or inductive proximity sensor. In some cases, the sensor 110 may be coupled to the second gripping surface 106. In some instances, the sensor may be arranged within the second gripping surface 106 such that the sensor 110 is flush with or at a slight protrusion to the second gripping surface 106. Such an arrangement may, in some circumstances, prevent interference by the sensor 116 in the one or more second suction cups 108 gripping an object. The sensor 116 may be oriented in the third direction that is opposite to the second direction in which the second suction cups provide suction. In this orientation, the sensor 116 may sense the proximity of an object as the linear actuator actuates the second gripping surface 106 towards the object. To facilitate the generation of data indicating that an object is adjacent to the second gripping surface, the proximity sensor may be calibrated or otherwise configured to the distance that the one or more second suction cups 108 protrude from the second gripping surface 106.

The suction gripper 100 may also include a brake 112. The brake 112 may be engaged to stop the movement of the linear actuator 110. Further, the brake 112 may hold (i.e. lock) the linear actuator in a position. For instance, where the linear actuator 110 includes a cylinder, the brake 112 may be a pneumatic or hydraulic brake that clamps on a side of the cylinder to brake the linear actuator 110. Other types of brakes are possible as well.

In some cases, the brake 112 may be responsive to data from the sensor 116. For instance, the brake 112 may lock the second gripping surface 106 in position adjacent to a face of an object (e.g., a side of the box 118) in response to data from the sensor 116 indicating that the second gripping surface 106 is adjacent to the face of the object.

FIG. 2 is a side-view of another example suction gripper 200. The suction gripper 200 includes a first gripping surface 202 and a second gripping surface 206. The first gripping surface 202 and the second gripping surface 206 are attached to a robotic arm 214. The robotic arm 214 may facilitate moving the first gripping surface 202 and the second gripping surface 206 into various positions. The first gripping surface 202 and the second gripping surface 206 include one or more first suction cups 204 and one or more second suction cups 208 respectively. The one or more first suction cups 204 and the one or more second suction cups 208 may provide suction in perpendicular directions.

The first gripping surface 202 and the second gripping surface 206 may be mounted to the robotic arm 214 by way of a linear actuator 210 and a linear actuator 218 respectively. In some cases, one or more electric motors, such as an electric servomotor, may actuate the linear actuator 210 and the linear actuator 218. In some implementations, linear actuators 210 and 218 may include respective piston-cylinder assemblies, as shown. The piston-cylinder assembly of linear actuator 218 may include a piston that is extendable longitudinally from the cylinder in a direction perpendicular to the first gripping surface 202. Such extension of the piston may move the first gripping surface 202 towards a face of an object (e.g., the top of box 118). The piston-cylinder assembly of linear actuator 210 may include a piston that is extendable longitudinally from the cylinder in a direction perpendicular to the second gripping surface 206. Such extension of the piston may move the second gripping surface 106 towards another face of the object (e.g., a side of box 118).

The suction gripper 200 may include sensor 216 and sensor 222. The sensors may be configured to generate data indicating that an object (such as the box 118) is adjacent to the respective gripping surfaces. Such sensors may be proximity sensors, such as infrared, capacitive, photoelectric, or inductive proximity sensors. The sensor 222 and the sensor 210 may be coupled to the first gripping surface 202 and the second gripping surface 206, respectively. The sensor 222 may be coupled to the first gripping surface 202 and oriented to sense the approaching face of the object when the linear actuator 218 moves the first gripping surface 202 in a direction opposite of the direction of suction of the one or more first suction cups 204. The sensor 216 may be coupled to the second gripping surface 206 and oriented to sense the approaching face of the object when the linear actuator 210 actuates the second gripping surface 206 in a direction opposite of the direction of suction of the one or more second suction cups 208. Other orientations that facilitate sensing objects that are adjacent to the gripping surfaces are possible as well.

The suction gripper 200 may also include a brake 212 and a brake 220. The brake 212 may be engaged to stop the movement of the linear actuator 210 and the brake 220 may be engaged to stop the movement of the linear actuator 218. In some cases, the brake 212 and the brake 220 may be responsive to data from the sensors 216 and 222 respectively. For instance, the brake 220 may lock the first gripping surface 202 in position adjacent to a face of an object in response to data from the sensor indicating that the first gripping surface 202 is adjacent to the face of the object. And the brake 212 may lock the second gripping surface 206 in position adjacent to a face of an object in response to data from the sensor indicating that the second gripping surface 206 is adjacent to the face of the object. The brakes may disengage (unlock) in response to signals from a control system.

Figure 3A:
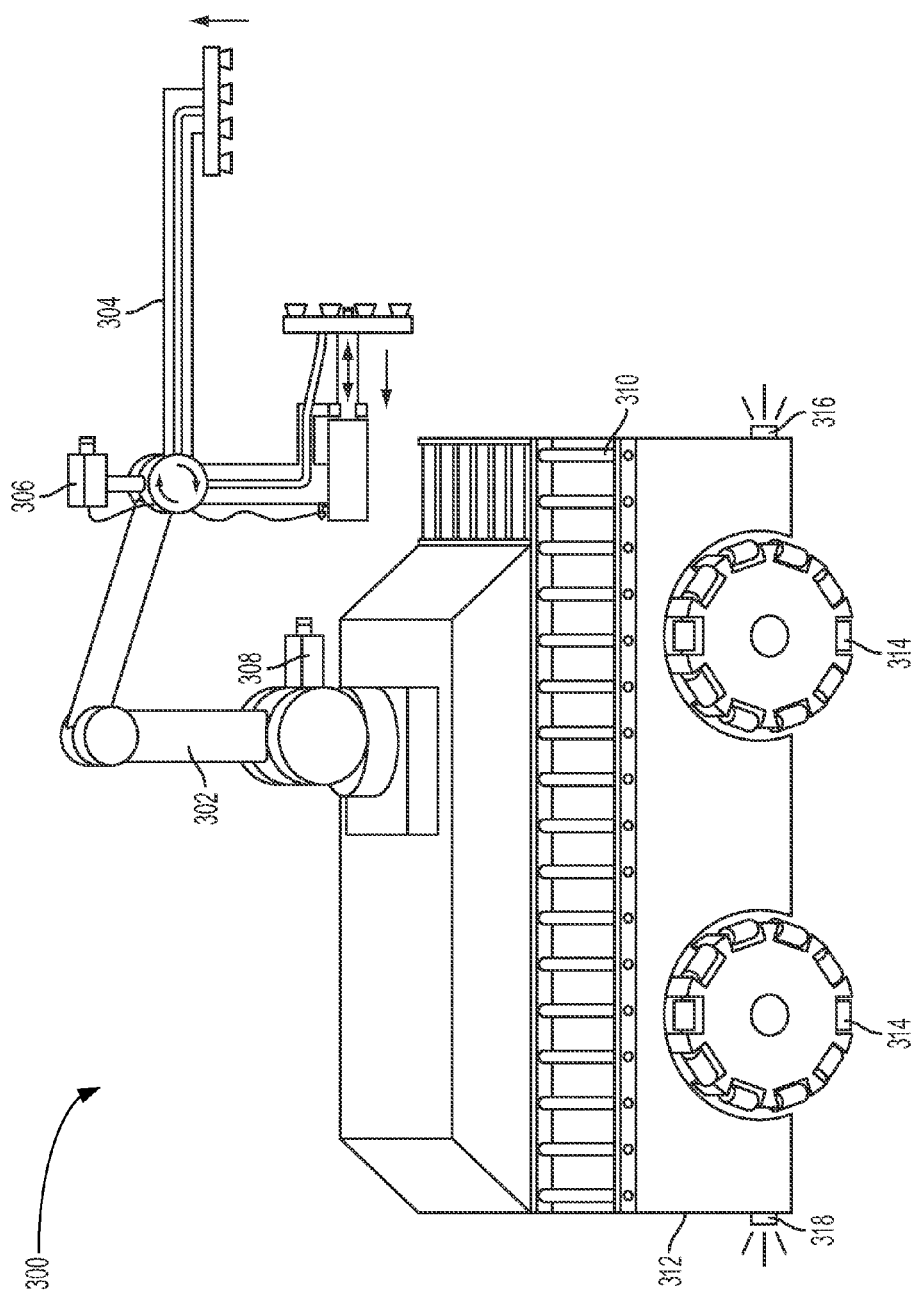
FIG. 3A is a side-view of the example robotic apparatus including the example suction gripper.

According to various implementations, a suction gripper may be connected to a robotic manipulator. The robotic manipulator may in turn be mounted on a holonomic cart (e.g., a cart with wheels that allow the cart to move in any direction). FIG. 3A depicts an exemplary holonomic cart containing a robotic manipulator. In some embodiments, a moveable cart 312 may include a robotic arm 302 mounted on the cart 312. The robotic arm 302 may contain a suction gripper 304 for gripping objects within the environment. The cart may contain one or more wheels 314, which may be holonomic wheels that operate with two degrees of freedom. In further embodiments, a wrap around front conveyor belt 310 may be included on the holonomic cart 312. The conveyor belt may include various types of conveyor systems, such as a roller conveyor system. In some examples, the wrap around front conveyer belt may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

Figure 3B:
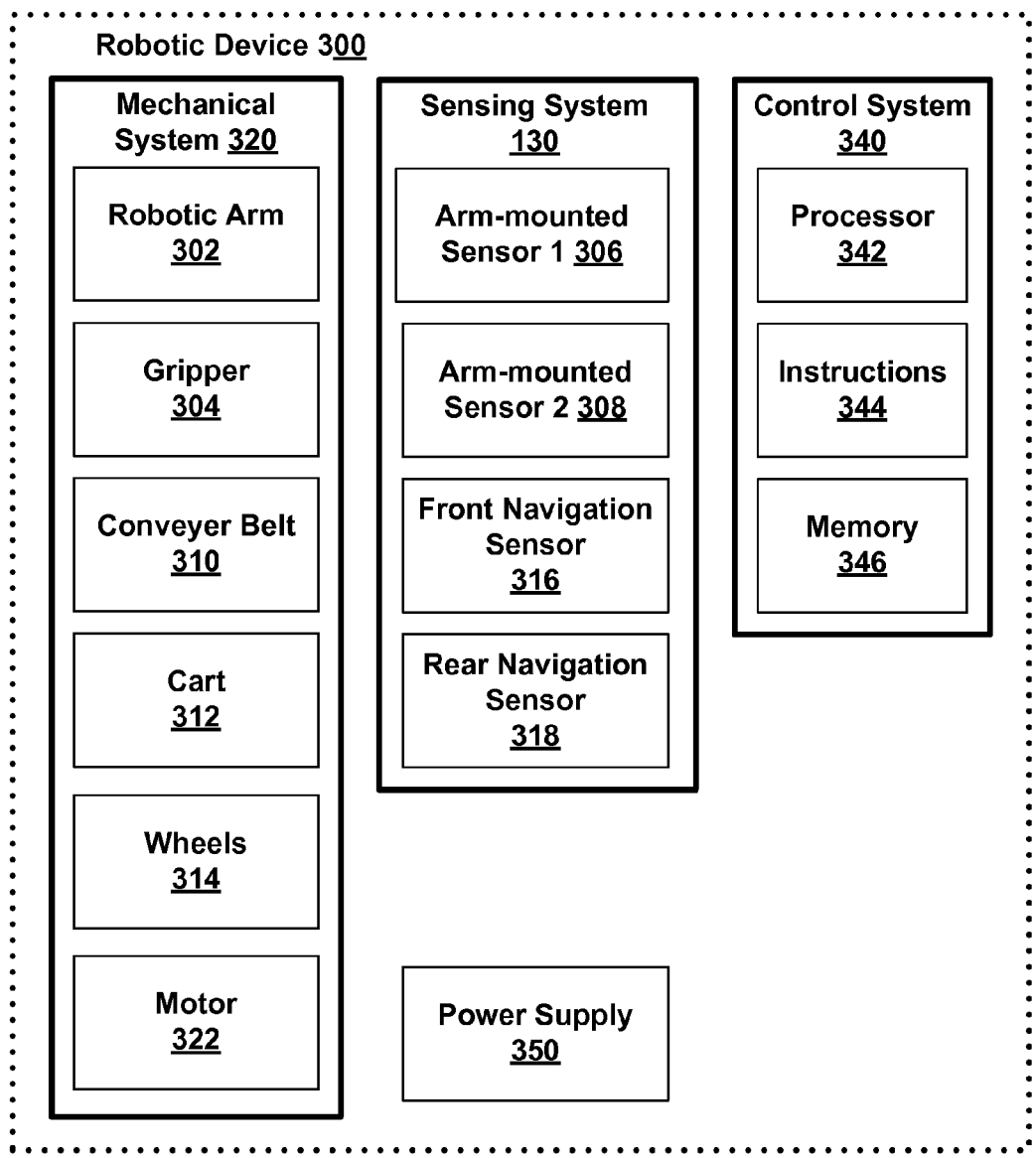
FIG. 3B is a functional block diagram illustrating the example robotic apparatus.

FIG. 3B is a functional block diagram illustrating a robotic apparatus 300, according to an example embodiment. The robotic apparatus 300 could include various subsystems such as a mechanical system 320, a sensing system 330, a control system 340, as well as a power supply 350. The robotic apparatus 300 may include more or fewer subsystems and each subsystem could include multiple elements. Further, each of the subsystems and elements of robotic apparatus 300 could be interconnected. Thus, one or more of the described functions of the robotic apparatus 300 may be divided up into additional functional or physical components, or combined into fewer functional or physical components. In some further examples, additional functional and/or physical components may be added to the examples illustrated by FIGS. 3A and 3B.

The mechanical system 320 may include components described above with respect to FIG. 1, including a robotic arm 302, a suction gripper 304, a conveyor belt 310, a (movable or holonomic) cart 312, and one or more wheels 314. The mechanical system 320 may additionally include a motor 122, which may be an electric motor powered by electrical power, or may be powered by a number of different energy sources, such as a gas-based fuel or solar power. Additionally, motor 322 may be configured to receive power from power supply 350. The power supply 350 may provide power to various components of robotic apparatus 300 and could represent, for example, a rechargeable lithium-ion or lead-acid battery. In an example embodiment, one or more banks of such batteries could be configured to provide electrical power. Other power supply materials and types are also possible.

The sensing system 330 may use one or more sensors attached to a robotic arm 302, such as sensor 306 and sensor 308, which may be 2D sensors and/or 3D depth sensors that sense information about the environment as the robotic arm 302 moves. The sensing system may determine information about the environment that can be used by control system 340 (e.g., a computer running motion planning software) to pick and move boxes efficiently. The control system 340 could be located on the apparatus or could be in remote communication with the apparatus. In further examples, scans from one or more 2D or 3D sensors with fixed mounts on a mobile base, such as a front navigation sensor 316 and a rear navigation sensor 318, and one or more sensors mounted on a robotic arm, such as sensor 306 and sensor 308, may be integrated to build up a digital model of the environment, including the sides, floor, ceiling, and/or front wall of a truck or other container. Using this information, the control system 340 may cause the mobile base to navigate into a position for unloading or loading.

In additional examples, planar surface information may be extracted from 3D sensors to model walls, floor and/or box faces. After modeling the floor, projection of objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distance from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 302 may be equipped with a suction gripper 304, such as the suction gripper 100 or the suction gripper 200. In such embodiments, the suction gripper 304 may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic apparatus can turn on any number of the suction devices as will fit boxes sensed for grabbing. In some implementations, the system may notice a seam in the boxes (separation between adjacent boxes) such that suckers can be activated on both sides of the seam to pick up both boxes at once, thereby doubling the throughput. In some embodiments, the suckers can sense after a certain amount time whether they can successfully grip a surface, after which they may automatically shut off. In further embodiments, sections of the suckers can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side to side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic apparatus 300 may be controlled by control system 340. Control system 340 may include at least one processor 342 (which could include at least one microprocessor) that executes instructions 344 stored in a non-transitory computer readable medium, such as the memory 346. The control system 340 may also represent a plurality of computing devices that may serve to control individual components or subsystems of the robotic apparatus 300 in a distributed fashion.

In some embodiments, memory 346 may contain instructions 344 (e.g., program logic) executable by the processor 342 to execute various functions of robotic apparatus 300, including those described above in connection with FIGS. 3A-3B. Memory 346 may contain additional instructions as well, including instructions to transmit data to, receive data from, interact with, and/or control one or more of the mechanical system 320, the sensor system 330, and/or the control system 340.

Figure 4:
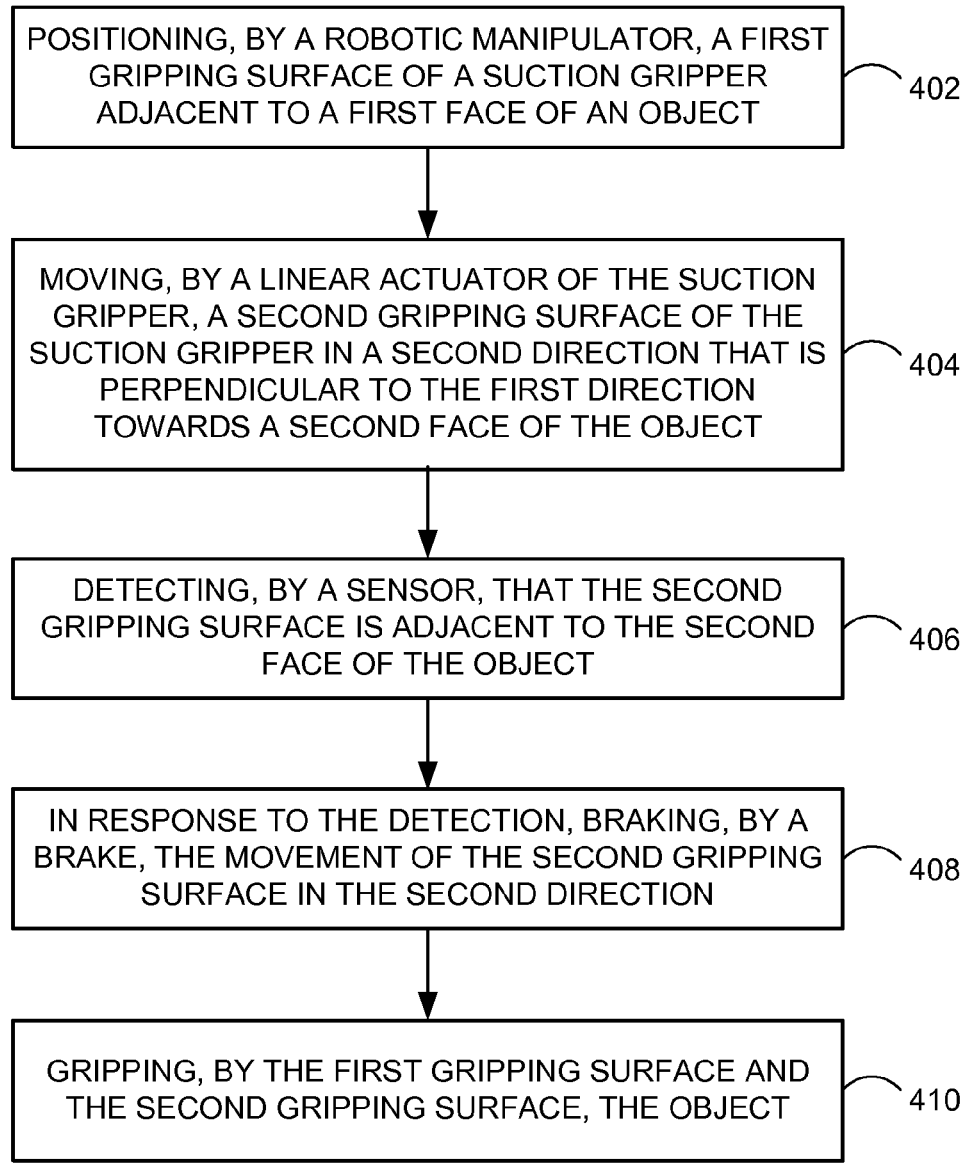
FIG. 4 is a flow diagram illustrating an example method to grip an object using a suction gripper.

FIG. 4 is a flow diagram illustrating an example method to grip an object. Method 400 shown in FIG. 4 presents an implementation of a method that, for example, could be performed by a control system communicatively coupled to a suction gripper and perhaps a robotic manipulator, such as a robotic arm. Method 400 may include one or more operations, functions, or actions as illustrated by one or more blocks of 402-410. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 400 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 400 and other processes and methods disclosed herein, each block in FIG. 4 may represent circuitry that is wired to perform the specific logical functions in the process.

Figure 5A:
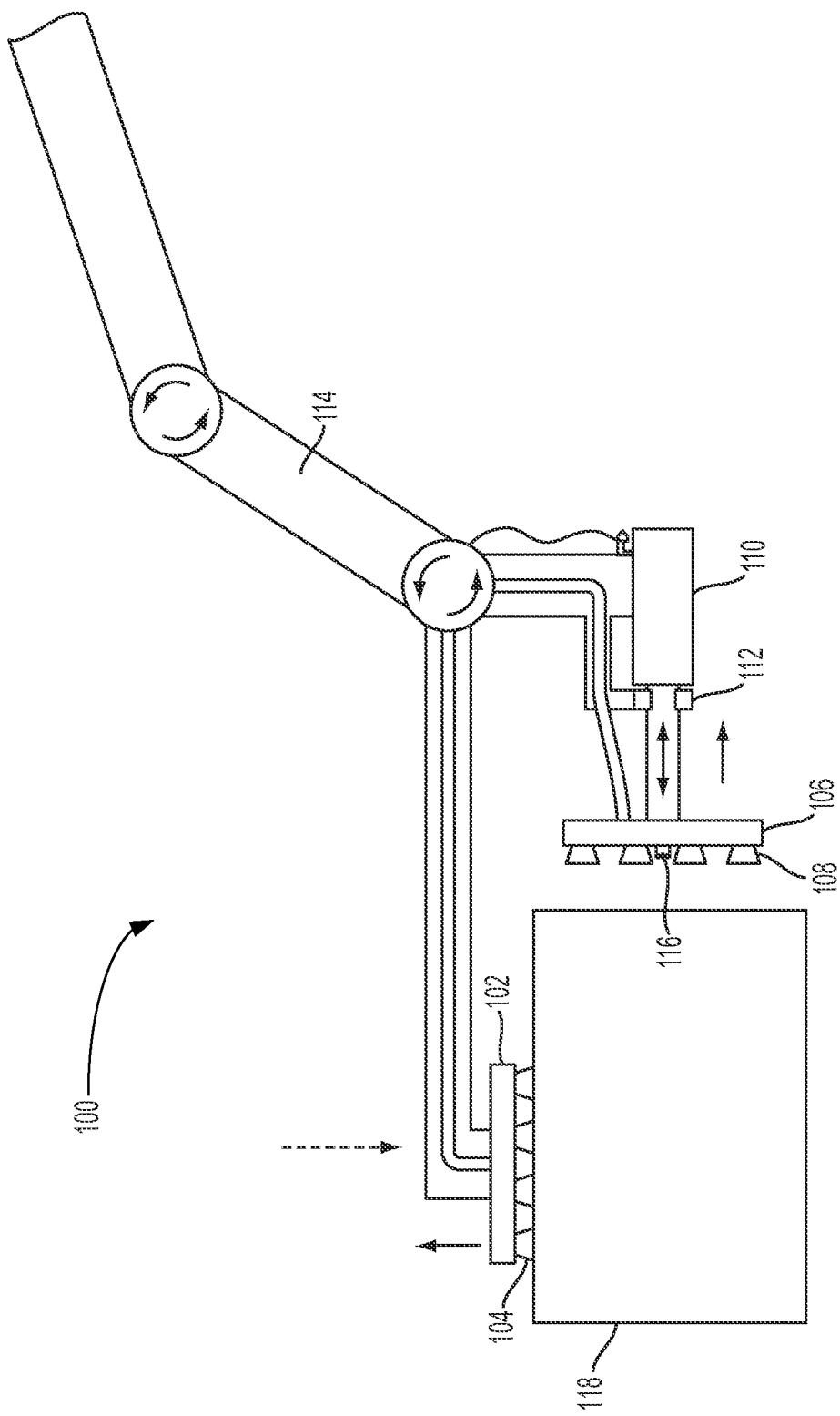
FIG. 5A is a side-view of the example suction gripper in which a first gripping surface of the suction gripper is adjacent to the box.

At block 402, the method involves positioning, by a robotic manipulator, a first gripping surface of a suction gripper adjacent to a first face of an object. For instance, as shown in FIG. 5A, the robotic arm 114 may position first gripping surface 102 adjacent to a top face of the box 118. As noted above, the first gripping surface 102 may include one or more first suction cups 104 that are arranged on the first gripping surface 102 to provide suction in a first direction. In the particular orientation of the robotic arm 104 and the suction gripper 100 shown in FIG. 5A, the one or more first suction cups 104 provide suction upwards.

A control system, such as control system 340, may cause the positioning of the first gripping surface adjacent to the first face of an object. More particularly, the control system may cause movement of the robotic arm 114, which may result in positioning the first gripping surface. A sensing system, such as sensing system 330, may facilitate positioning the first gripping surface of the suction gripper adjacent to the first gripping surface. As noted above, the control system 340 may extract planar surface information from 3D sensors to model walls, floor and/or box faces.

In one instance, the control system 340 may extract planar surface information for the top of the box 118 and a side of the box 118. The control system may cause the first gripping surface 102 to approach the box 118 from the right, as shown in FIG. 5A. The control system may then cause the robotic arm 114 to move the first gripping surface 102 across a front (right) half of the top face of the box 118 to the back (left) half of the top face of the box 118. Gripping the box by the back half of the top face of the box 118 may improve stability of the box while it is being gripped by the suction 100.

In some implementations, the suction gripper may grip a particular portion of the top face of the box 118 (e.g., the front half, the middle, or the back half of the box). Gripping the top side of the box 118 in different regions may variably lessen the operating space involved in gripping the box 118 (e.g., when gripping the front half of the box) or provide greater stability to the gripped box (e.g., when gripping the back half of the box).

For instance, in gripping the back half of the top side of the box 118, the control system may lower the first gripping surface 102 towards the back (left) half of the top face of the box 118. A sensor may detect that the first gripping surface is adjacent to the top of the box 118. In response to the detection, the control system may cause the robotic arm 114 to hold the first gripping surface 102 in position adjacent to the back (left) half of the top face of the box 118. As noted above, detecting that a gripping surface is adjacent to the box 118 and then holding the position of the gripping surface may prevent deformation of suction cups on the gripping surface. The control system may cause the robotic arm 114 to maintain this position while the linear actuator 110 moves the second gripping surface 106 towards the box 118.

Figure 6A:
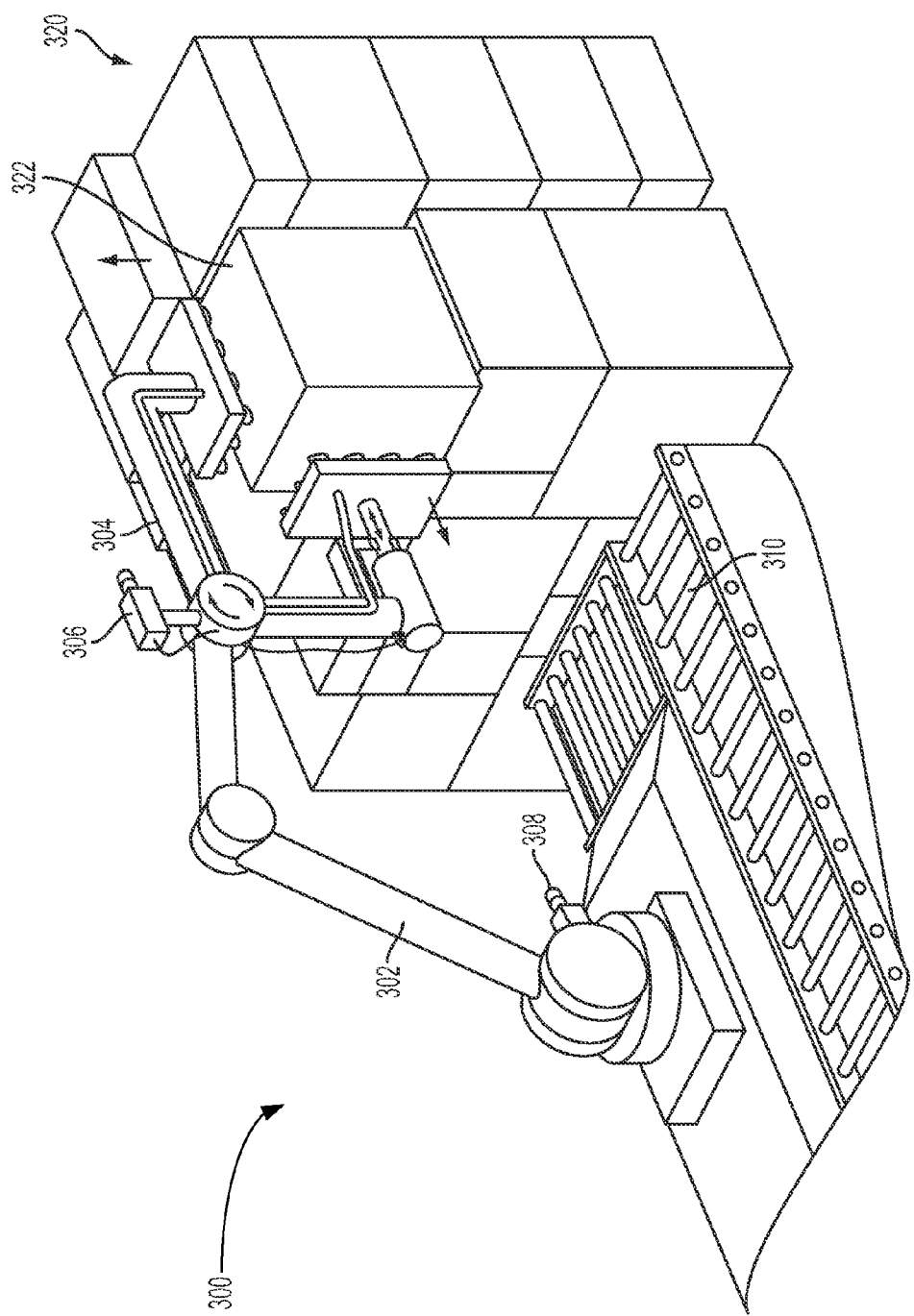
FIG. 6A is a perspective view of portions of the example robotic apparatus in which the example robotic gripper is near a box in a stack of boxes.

FIG. 6A illustrates another example of positioning the first gripping surface of a suction gripper adjacent to a first face of an object. FIG. 6A shows the robotic apparatus 300 of FIG. 3A next to a stack of boxes 320, which includes a box 322. Sensors 306 and 308 may generate data indicative of the stack of boxes. A control system, such as control system 340, may extract planar surface information from the generated data. The control system may then cause robotic arm 302 to position suction gripper 304 adjacent to the top of box 322.

Figure 5B:
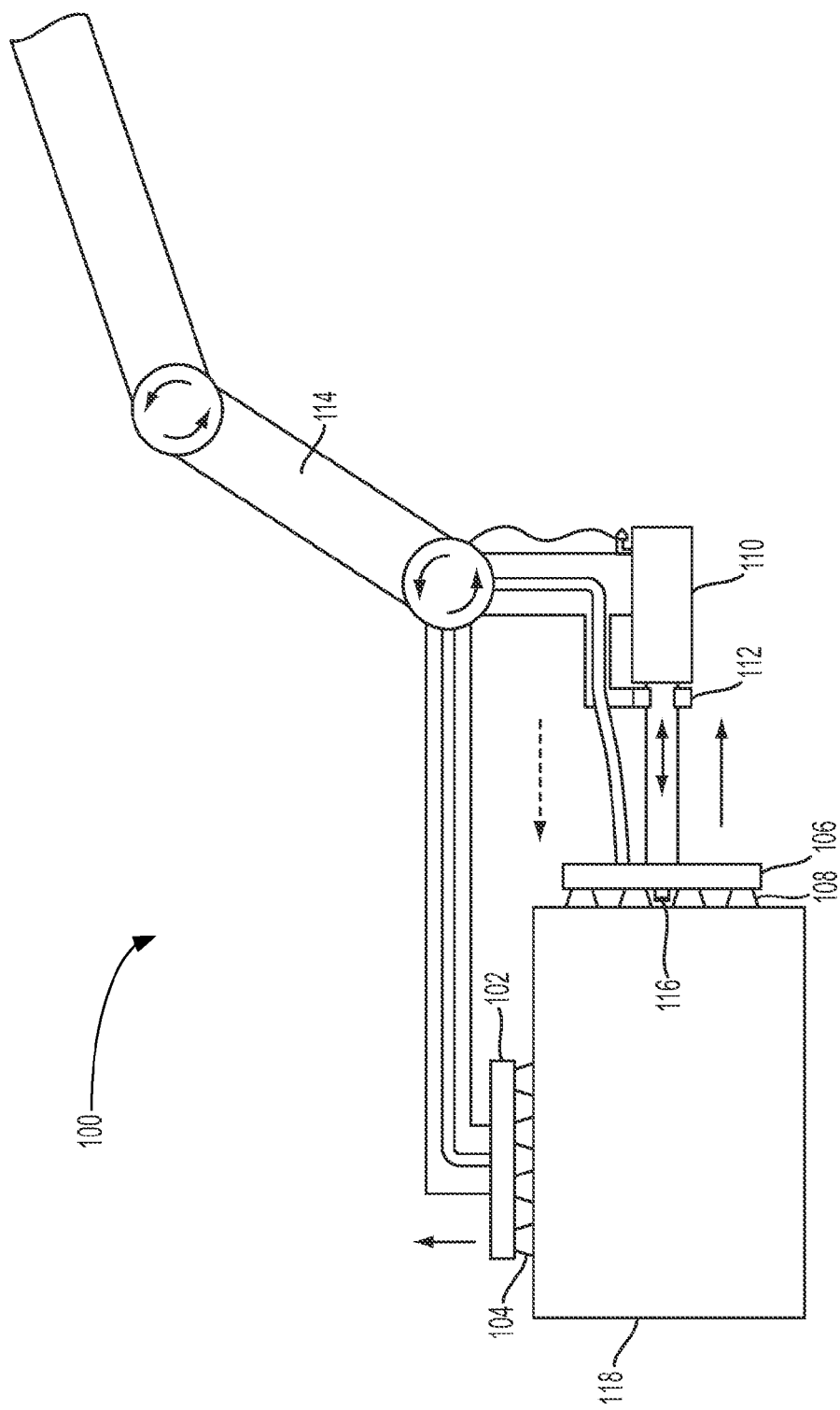
FIG. 5B is a side view-of the example robotic gripper in which the first gripping surface and a second gripping surface of the suction gripper are adjacent to the box.

Referring back to FIG. 4, at block 404, the method involves moving, by a linear actuator of the suction gripper, a second gripping surface of the suction gripper in a second direction that is perpendicular to the first direction towards a second face of the object. For instance, the control system may cause the linear actuator 110 to move the second gripping surface 106 from the position shown in FIG. 5A towards the side of box 118 as shown in FIG. 5B. As noted above, the second gripping surface 106 may include one or more second suction cups 108 arranged to provide suction in a third direction that is opposite the second direction. In the particular orientation of the robotic arm 104 and the suction gripper 100 shown in FIG. 5B, the one or more second suction cups 108 provide suction to the right.

In this way, the second gripping surface 106 (and the one or more second suction cups 108) may approach the side of the box 118 from a direction that is perpendicular to the side of the box 118. In some circumstances, suction cups may provide a greater gripping force when the suction force that engages the side of the box 118 is at a perpendicular direction to the side of the box. When the suction force engages the side of the box 118 at an angle, the curved surface of one or more suction cups may press against the side of the box 118 unevenly, which may result in less negative pressure in the volume formed by the suction cup and the side of the box 118.

At block 406, the method involves detecting, by a sensor, that the second gripping surface is adjacent to the second face of the object. For instance, as shown in FIG. 5B, sensor 116 may detect that the gripping surface 106 is adjacent to the side of the box 118. The sensor may be calibrated to detect that the second gripping surface is adjacent to the second face before the linear actuator substantially causes the one or more suction cups 108 to press against the side of the box 118.

At block 408, in response to the detecting that the second gripping surface is adjacent to the second face of the object, the method involves braking, by a brake, the movement of the second gripping surface in the second direction. For instance, the control system may engage the brake 112. After the brake is engaged, the linear actuator may stop providing movement to the second gripping surface 106.

When engaged, the brake 112 may hold the second gripping surface in position adjacent to the second face of the object. As noted above, an electric motor may actuate the linear actuator 110. Such an electric motor may consume power in actuating the linear actuator. In a circumstance in which a force is acting upon the linear actuator (e.g., weight of an object gripped by the gripping surfaces), the electric motor may also consume power holding the linear actuator in a position. However, with the brake engaged, the linear actuator may maintain position without the electric motor. In some instances, since the brake maintains position of the linear actuator, a smaller electric motor may be used to actuate the linear actuator, as the electric motor does not necessarily need to be sized to have sufficient power to hold the linear actuator in position when the linear actuator is gripping an object.

At block 410, the method involves gripping, by the first gripping surface and the second gripping surface, the object. Gripping the object may involve causing, by the control system, the first suction cups of the first gripping surface to provide suction in the first direction to engage the top face of the object and causing, by the control system, the second suction cups of the second gripping surface to provide suction in the third direction to engage the second face of the object. For instance, the control system may engage an air pump coupled to the suction cups, which creates negative pressure between the suction cups and the sides of the box 118. The control system may simultaneously cause the first suction cups of the first gripping surface to provide suction in the first direction and the second suction cups of the second gripping surface to provide suction in the third direction, which may facilitate providing the suction force at a perpendicular angle to the sides of the box 118.

After causing the suction cups to provide suction, the method may further involve, moving, by the robotic manipulator, the suction gripper upwards such that the object is lifted. For instance, the robotic arm 114 may lift the suction gripper 100 upwards. The robotic arm 114 may then move the object to another location, such as onto a conveyor belt or pallet.

As shown in FIG. 5B, the one or more first suction cups 104 may provide a suction force that is parallel to gravity, while the one or more second suction cups 108 may provide a suction force that is perpendicular to gravity (i.e., a sheer force). In some circumstances, the suction force provided by suction cups may increase as the direction of the suction force becomes closer to parallel with the force of gravity and decrease as the direction of the suction force becomes closer to perpendicular to the force of gravity.

After moving the first gripping surface and the second gripping surface upwards, the method may involve rotating the suction gripper such that the first direction of suction and third direction of suction are in respective non-perpendicular directions to gravity. In some cases, rotating the suction gripper may increase the gripping force of the gripper because the suction forces are at non-perpendicular angles to gravity. A perpendicular force to gravity (i.e., a sheer force) may result in less lateral bending of the flexible circular cups of the suction cups. Lateral bending of the flexible circular cups may cause uneven force around the circular cups, which may cause a gap to form between the suction cup and the surface, thereby releasing the negative pressure.

Figure 5C:
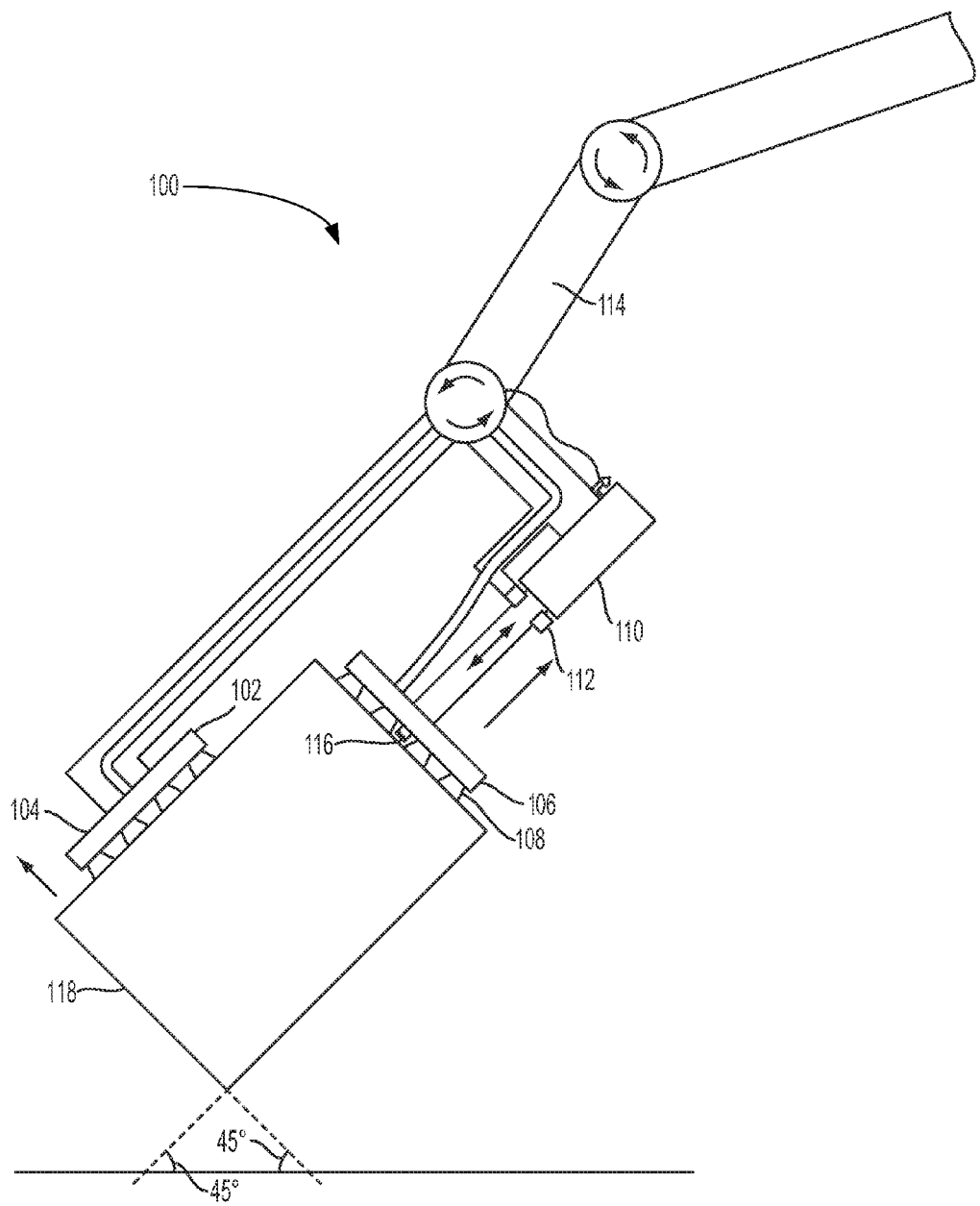
FIG. 5C is a side view-of the example suction gripper in which the suction gripper is picking up the box.

Relative to FIG. 5B, FIG. 5C shows rotation of suction gripper 100 such that the first direction of suction and third direction of suction are in respective non-perpendicular directions to gravity (i.e., 45 degree angles to gravity). A 45 degree angle between the force of gravity and the force of suction is not required. However, such an angle may balance the suction forces of the one or more first suction cups 104 and the one or more second suction cups 108.

Figure 6B:
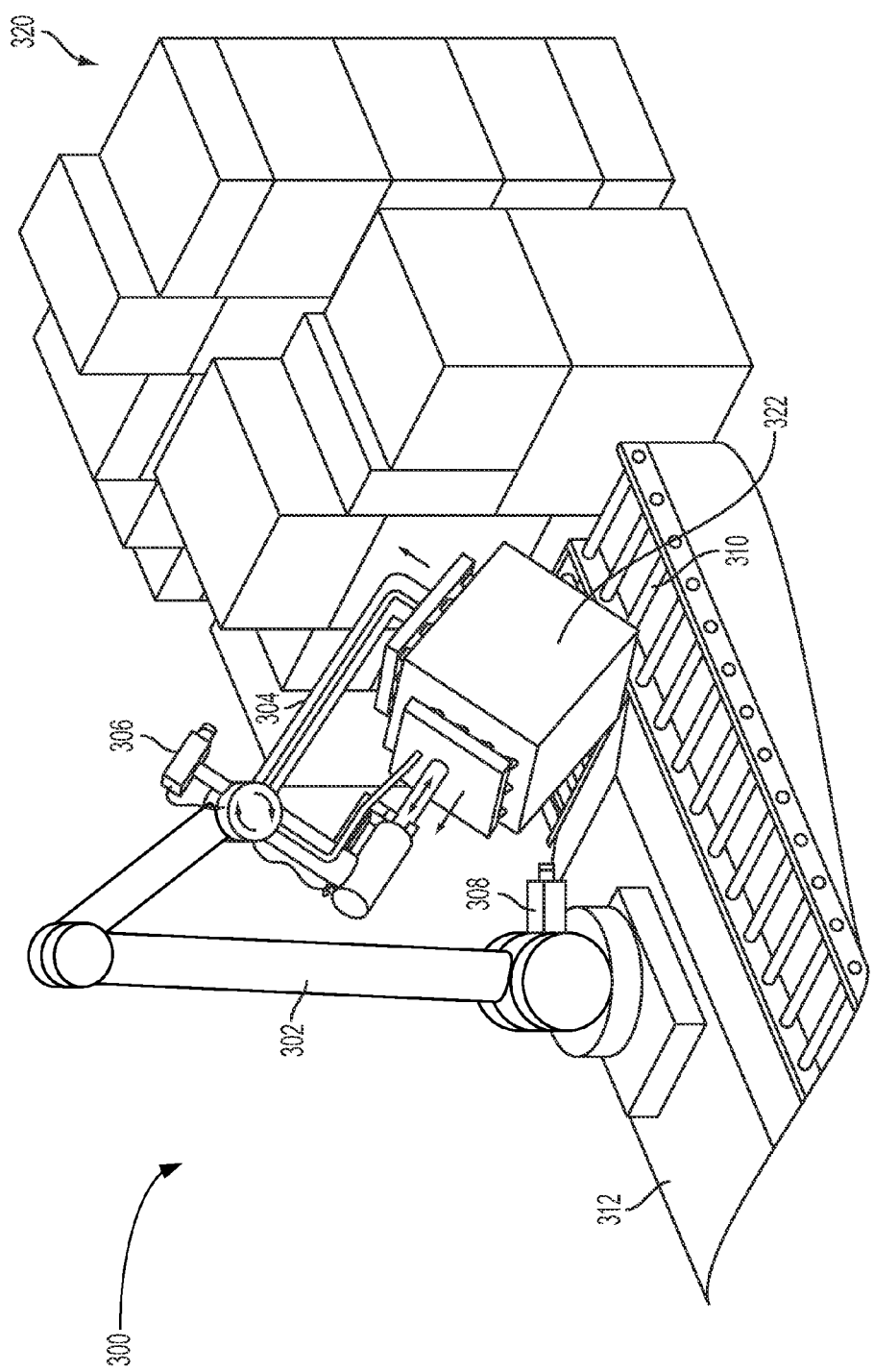
FIG. 6B is a perspective view of portions of the example robotic apparatus in which the example robotic gripper is picking up the box in the stack of boxes for placement on a conveyor.

FIG. 6B illustrates the robotic apparatus 300 gripping the box 322. Relative to FIG. 6A, FIG. 6B shows the progression of gripping the box 322 and rotating the suction gripper 304 such that the first direction of suction and third direction of suction are in respective non-perpendicular directions to gravity. The robotic apparatus 300 may place the box 322 on the conveyor 310.

Figure 7:
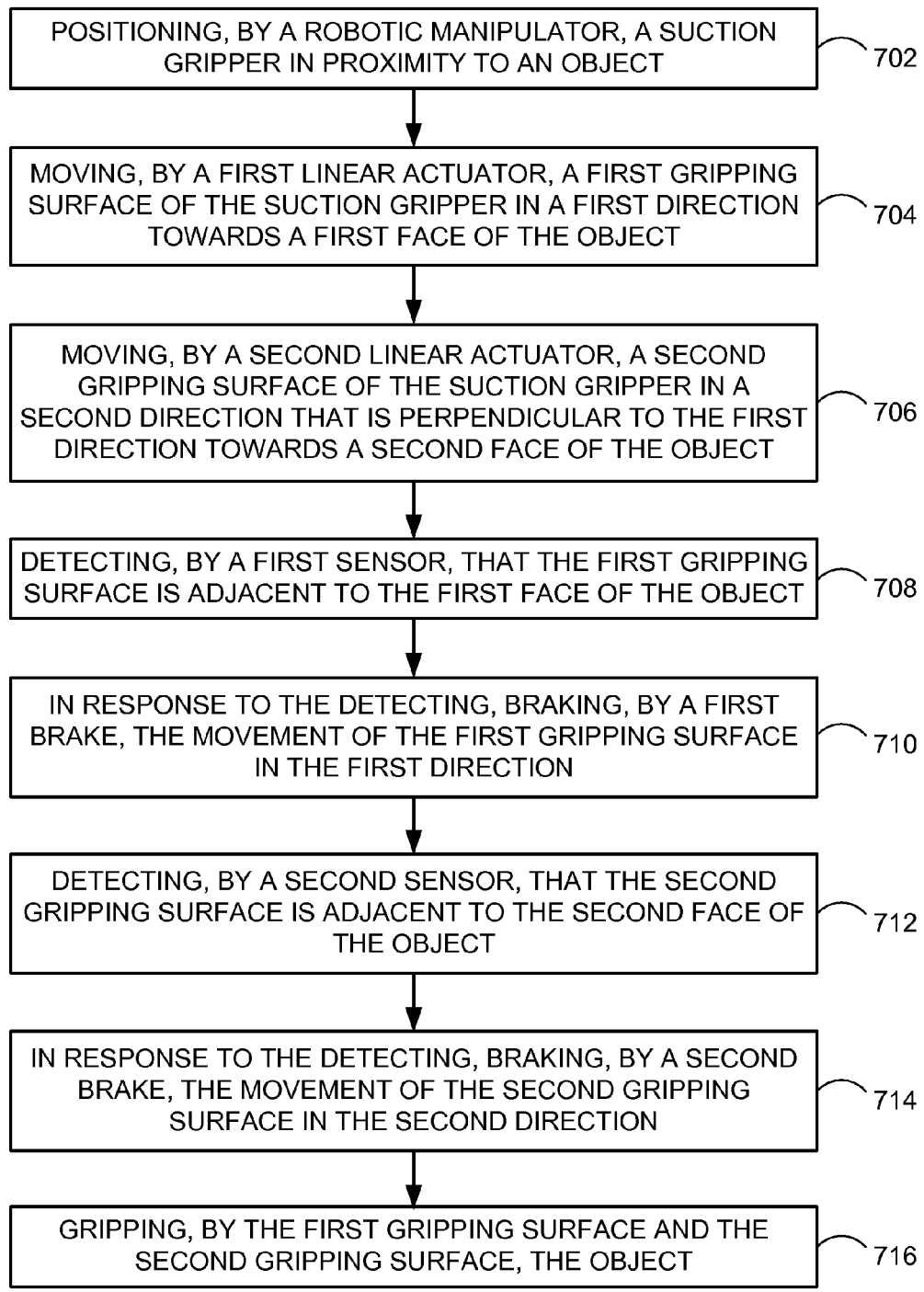
FIG. 7 is a flow diagram illustrating another example method to grip an object using a suction gripper.

FIG. 7 is a flow diagram illustrating another example method to grip an object. Method 700 shown in FIG. 7 presents an implementation of a method that, for example, could be performed by a control system communicatively coupled to a suction gripper and perhaps a robotic manipulator, such as a robotic arm. Method 700 may include one or more operations, functions, or actions as illustrated by one or more blocks of 702-716. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 700 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 700 and other processes and methods disclosed herein, each block in FIG. 7 may represent circuitry that is wired to perform the specific logical functions in the process.

At block 702, the method involves positioning, by a robotic manipulator, a suction gripper in proximity to an object. For instance, referring back to FIG. 2, a control system may cause robotic arm 214 to position suction gripper 200 in proximity to box 118. In some examples, the first linear actuator is capable of moving the first gripping surface a first distance and the second linear actuator is capable of moving the second gripping surface a second distance (e.g., the respective lengths of travel of the pistons out of the cylinders). In such examples, the control system may cause the robotic arm 114 to position the suction gripper 200 such that the first gripping surface is within the first distance from the top face of the object (e.g., the top of box 118) and the second gripping surface of the suction gripper is within the second distance from the second face of the object (e.g., a side of box 118).

At block 704, the method involves moving, by a first linear actuator, a first gripping surface of the suction gripper in a first direction towards a first face of the object. For instance, the control system may cause linear actuator 218 may move first gripping surface 202 in a first direction towards the top of the box 118.

At block 706, the method involves moving, by a second linear actuator, a second gripping surface of the suction gripper in a third direction that is perpendicular to the first direction towards a second face of the object. For example, the control system may cause linear actuator 210 to move second gripping surface 206 in a third direction that is perpendicular to the first direction towards a side of the box 118.

At block 708, the method involves detecting, by a first sensor, that the first gripping surface is adjacent to the first face of the object. For instance, the control system may receive data from sensor 222. Based on the received data, the control system may determine that the first gripping surface 202 is adjacent to the top side of the box 118.

At block 710, in response to detecting that the first gripping surface is adjacent to the first face of the object, the method involves, braking, by a first brake, the movement of the first gripping surface in the first direction. For instance, the control system may engage brake 220.

At block 712, the method involves detecting, by a second sensor, that the second gripping surface is adjacent to the second face of the object. For example, the control system may receive data from sensor 216. Based on the received data, the control system may determine that the second gripping surface 206 is adjacent to the side of the box 118.

At block 714, in response to detecting that the second gripping surface is adjacent to the second face of the object, the method involves braking, by a second brake, the movement of the second gripping surface in the third direction. For instance, the control system may engage brake 212.

At block 716, the method involves gripping, by the first gripping surface and the second gripping surface, the object. For instance, the control system may cause an air pump to provide suction at the one or more first suction cups 204 and the one or more second suction cups 208.

Figure 8A:
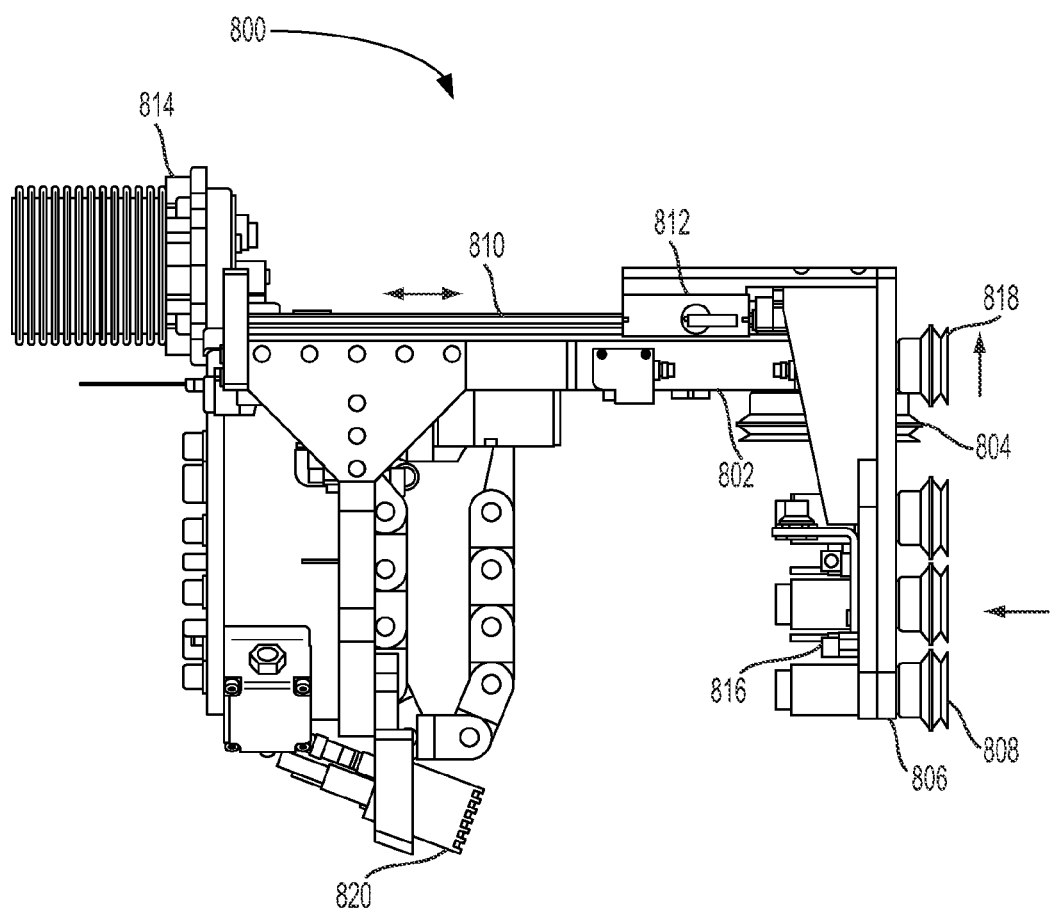
FIG. 8A is a side-view of a third example suction gripper in an extended configuration.

FIG. 8A is a side-view of an example suction gripper 800 in an extended configuration. The suction gripper 800 includes a first gripping surface 802 and a second gripping surface 804. The first gripping surface 802 and the second gripping surface 804 include suction cups 804 and suction cups 808, The suction gripper 800 includes a linear actuator 810 which moves the second gripping surface 804 relative to the first gripping surface 802. The suction gripper 800 is also shown with a brake 812, which operates to brake the movement of the linear actuator 810. The suction gripping further includes a vacuum and control harness 814, which may have connect the suction gripper 800 to a robotic arm, such as robotic arm 114. The vacuum and control harness may include couplings by which the suction gripper 800 may connect to a vacuum pump, a control system, and/or other components.

As noted above, the suction gripper 800 is in an extended configuration, in which the linear actuator 810 is extended to align with a fixed front suction cup 818. In the extended configuration, the suction gripper 800 may engage objects on one side using the second suction cups 808 and/or the fixed front suction cup 818.

The suction gripper 800 also includes a depth camera 820, which may generate data indicating positions of objects in relation to the suction gripper 800. A control system may receive this data, and align the first gripping surface 802 and/or the second gripping surface 806 adjacent to object faces based on the received data.

Figure 8B:
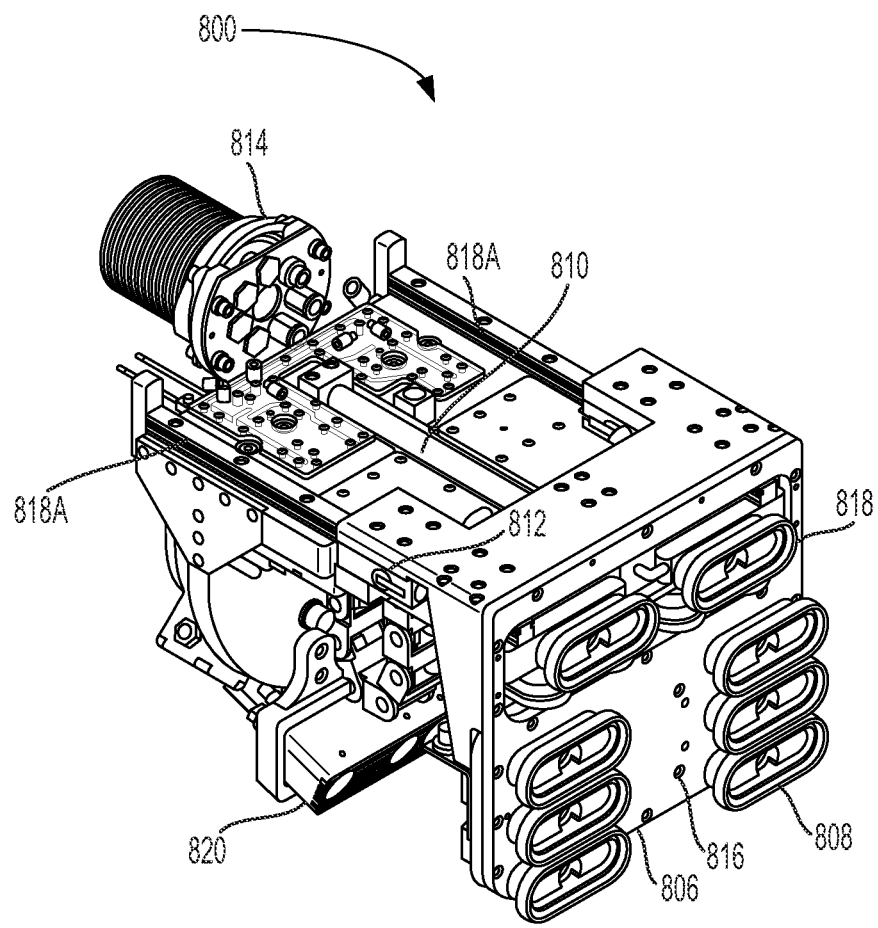
FIG. 8B is a side-view of the third example suction gripper in the extended configuration.

FIG. 8B is a side-view of the example suction gripper 800 in the extended configuration. FIG. 8B shows the first gripping surface 802 and the second gripping surface 806 of the suction gripper 800. FIG. 8B also shows a sensor 816, which may be configured to generate data indicating that an object (such as a box) is adjacent to the second gripping surface 806.

Suction gripper 800 also includes fixed rails 818A and 818B. The linear actuator 810 may move the second gripping surface 806 along fixed rails 818A and 818B. Fixed rails 818A and 818B may assist in maintaining the first gripping surface 802 and the second gripping surface 806 at normal angles to one another.

Figure 8C:
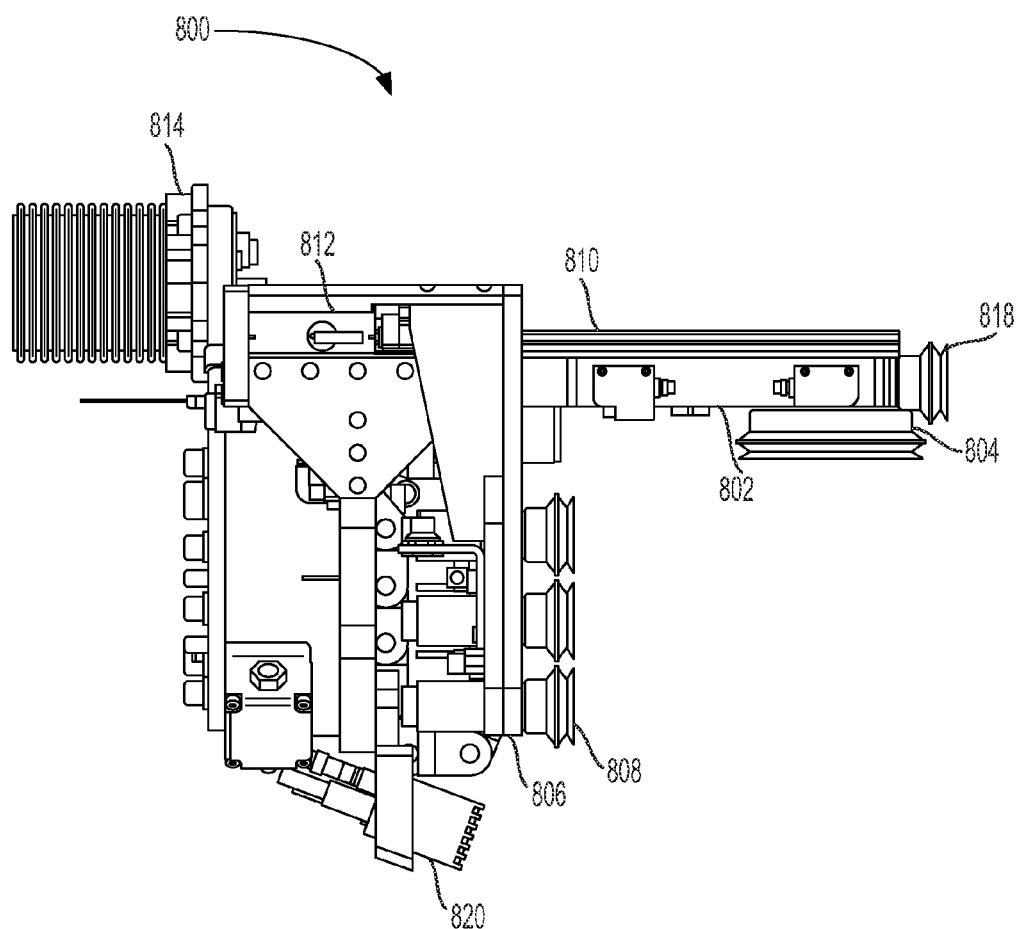
FIG. 8C is a side-view of the third example suction gripper in a retracted configuration.

FIG. 8C is a side-view of the example suction gripper 800 in a retracted configuration. In the retracted configuration, the linear actuator 810 is retracted away from the fixed front suction cup 818. In the retracted configuration, the suction gripper 800 may engage objects on one or two sides using the first suction cups 804 and/or the second suction cups 808.

Figure 9A:
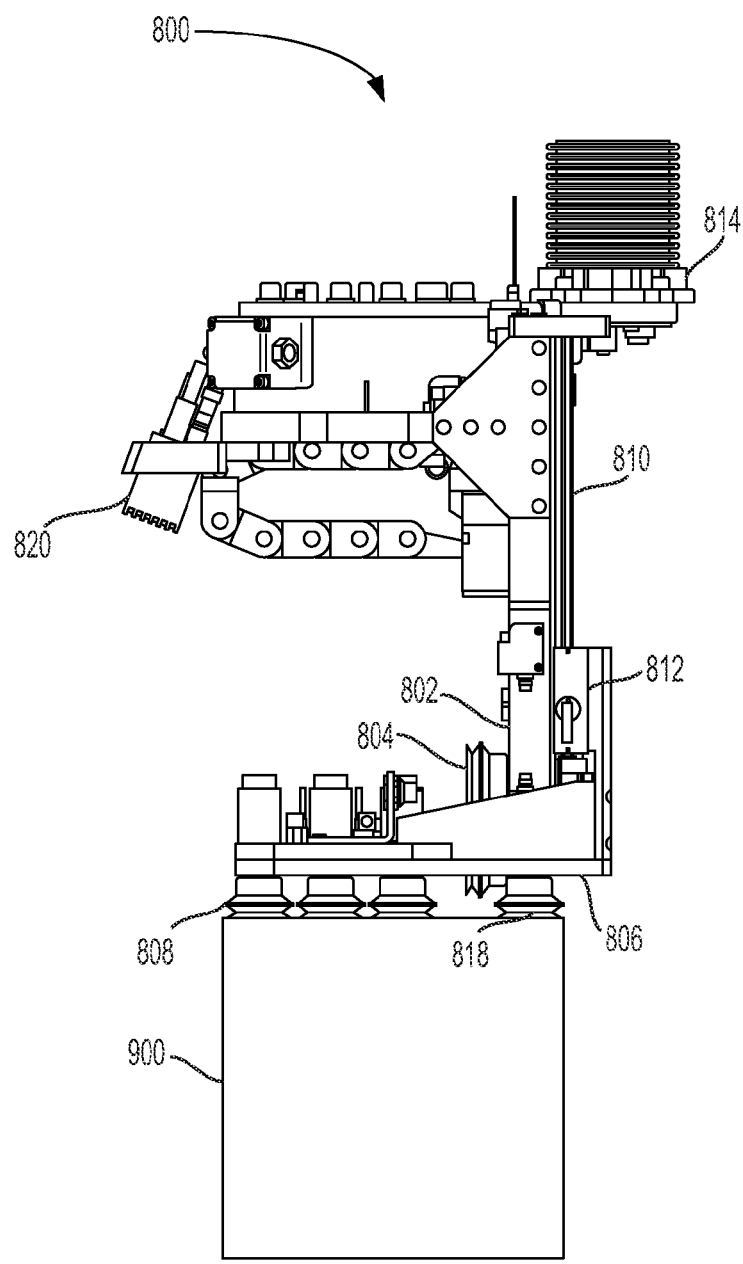
FIG. 9A is a side-view of the third example suction gripper in the extended configuration in which a second gripping surface is adjacent to a box.

FIG. 9A is a side-view of the example suction gripper 800 in the extended configuration in which a second gripping surface is adjacent to a box 900. Compared to FIG. 8A, the suction gripper 800 is rotated 90 degrees. In this orientation, the suction gripper 800 may engage a top side of box 900 by way of the second suction cups 808 and/or the fixed front suction cup 818, as shown.

Figure 9B:
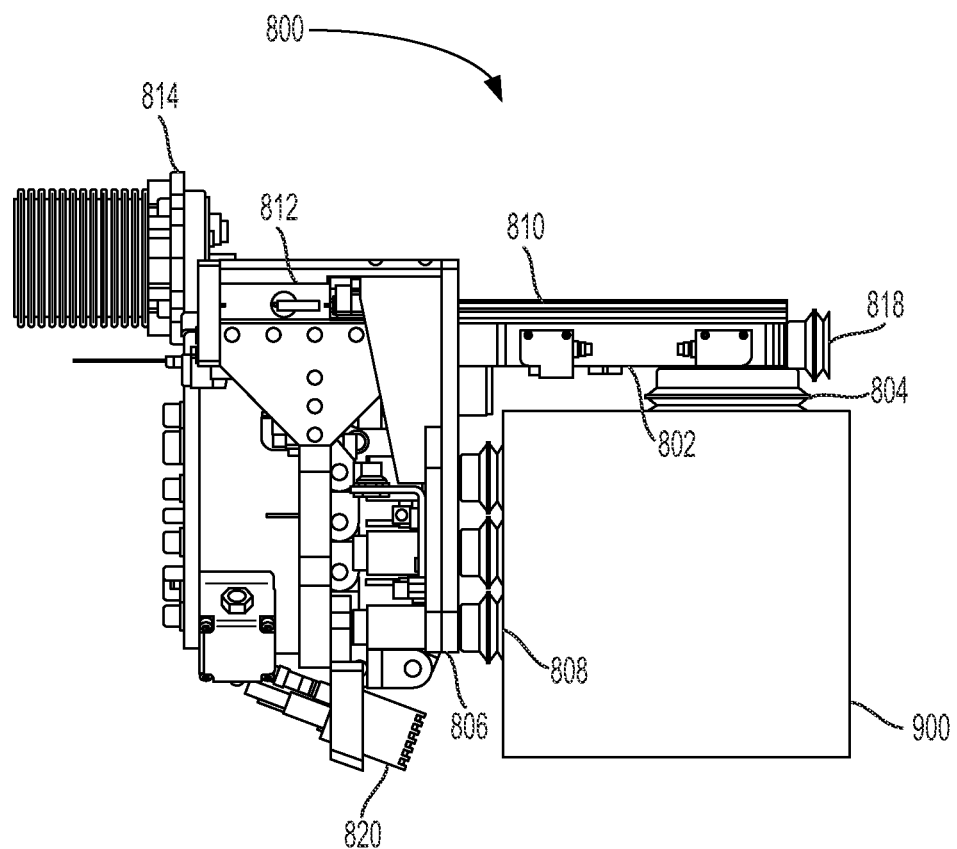
FIG. 9B is a side-view of the third example suction gripper in the retracted configuration in which a first gripping surface and the second gripping surface are adjacent to the box.

FIG. 9B is a side-view of the example suction gripper 800 in the retracted configuration in which the first gripping surface 802 and the second gripping surface 806 are adjacent to the box 900. In the retracted configuration, the suction gripper 800 may engage the top side of the box 900 and/or a side of the box 900 by way of the first suction cups 804 and/or the second suction cups 808.

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A gripping method comprising:
   positioning, by a robotic manipulator, a first gripping surface of a suction gripper adjacent to a first face of an object, wherein the first gripping surface comprises one or more first suction cups arranged to provide suction in a first direction;
   moving, by a linear actuator of the suction gripper, a second gripping surface of the suction gripper in a second direction that is perpendicular to the first direction towards a second face of the object, wherein the second gripping surface comprises one or more second suction cups arranged to provide suction in a third direction that is opposite the second direction, and wherein the second gripping surface is linearly-movable relative to the first gripping surface;
   receiving, from a sensor coupled to the second gripping surface, sensor data indicating a distance between the second face of the object and the second gripping surface as the second gripping surface moves towards the second face of the object;
   determining, based on the received sensor data, that the second gripping surface is adjacent to the second face of the object;
   in response to determining that the second gripping surface is adjacent to the second face of the object, braking, by a brake, the movement of the second gripping surface in the second direction; and
   after braking the movement of the second gripping surface, gripping, by the first gripping surface and the second gripping surface, the object.

2. The method of claim 1, wherein braking the movement of the second gripping surface in the second direction comprises:
   holding, by the brake of the suction gripper, the second gripping surface in position adjacent to the a second face of the object.

3. The method of claim 1, wherein gripping the object comprises:
   causing, by a control system, the first suction cups of the first gripping surface to provide suction in the first direction to engage the first face of the object; and
   causing, by the control system, the second suction cups of the second gripping surface to provide suction in the third direction to engage the second face of the object.

4. The method of claim 3, wherein the control system simultaneously causes the first suction cups of the first gripping surface to provide suction in the first direction and the second suction cups of the second gripping surface to provide suction in the third direction.

5. The method of claim 1, further comprising:
   after gripping the object, moving, by the robotic manipulator, the suction gripper upwards to lift the object.

6. The method of claim 5, further comprising:
   after moving the suction gripper upwards, rotating the suction gripper such that the first direction of suction and third direction of suction are in respective non-perpendicular directions to gravity.

7. A suction gripper, comprising:
   a first gripping surface comprising one or more first suction cups arranged to provide suction in a first direction when the first gripping surface is positioned adjacent to a first face of an object;
   a second gripping surface comprising one or more second suction cups arranged to provide suction in a second direction which is perpendicular to the first direction, wherein the second gripping surface is linearly-movable relative to the first gripping surface;
   a linear actuator configured to provide movement of the second gripping surface in a third direction towards a second face of the object, wherein the third direction is opposite the second direction;
   a sensor, coupled to the second gripping surface, configured to generate sensor data indicating a distance between the second face of the object and to the second gripping surface as the second gripping surface moves towards the second face of the object;
   an engageable brake configured to stop the movement of the second gripping surface; and
   a control system configured to:
     receive the sensor data from the sensor;
     determine, based on the received sensor data, that the second gripping surface is adjacent to the second face of the object; and
     cause the engageable brake to stop the movement of the second gripping surface in response to determining that the second gripping surface is adjacent to the second face of the object; and
   wherein the first gripping surface and the second gripping surface are configured to grip the object after the engageable brake stops the movement of the second gripping surface.

8. The suction gripper of claim 7, wherein the first gripping surface is coupled to a first mount of a robotic manipulator, and the linear actuator and the second gripping surface are coupled to a second mount of the robotic manipulator, wherein the first mount is disconnected from the second mount.

9. The suction gripper of claim 7, wherein-the engageable brake is further configured to hold the second gripping surface in position adjacent to the second face of the object in response to determining that the second gripping surface is adjacent to the second face of the object.

10. The suction gripper of claim 7, wherein the linear actuator is further configured to stop providing movement of the second gripping surface when the engageable brake is engaged.

11. The suction gripper of claim 7, wherein the linear actuator comprises:
    a cylinder extending longitudinally in a direction perpendicular to the second gripping surface; and
    an actuator that moves the cylinder in the direction perpendicular to the second gripping surface.

12. The suction gripper of claim 11, wherein the brake comprises:
    a pneumatic brake that clamps on a side of the cylinder to brake the linear actuator.

13. The suction gripper of claim 7, wherein the first direction is vertical and the second direction is horizontal.

14. The suction gripper of claim 7, wherein the sensor is coupled to the second gripping surface and oriented in a third direction that is opposite to the second direction in which the second suction cups provide suction.

* * * * *